United States Patent
Jung et al.

(10) Patent No.: US 9,477,684 B2
(45) Date of Patent: Oct. 25, 2016

(54) IMAGE PROCESSING APPARATUS AND CONTROL METHOD USING MOTION HISTORY IMAGES

(71) Applicant: Samsung Electronics Co., Ltd., Suwon-si (KR)

(72) Inventors: Kyung-boo Jung, Seoul (KR); Mikiyas Teshome, Suwon-si (KR); Dong-ho Lee, Seoul (KR); Bong-seok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 78 days.

(21) Appl. No.: 14/506,851

(22) Filed: Oct. 6, 2014

(65) Prior Publication Data
US 2015/0104077 A1 Apr. 16, 2015

(30) Foreign Application Priority Data
Oct. 15, 2013 (KR) ........................ 10-2013-0122706

(51) Int. Cl.
*G06K 9/00* (2006.01)
*G06F 3/01* (2006.01)
*G06F 17/30* (2006.01)

(52) U.S. Cl.
CPC ......... *G06F 17/30244* (2013.01); *G06F 3/017* (2013.01); *G06K 9/00342* (2013.01)

(58) Field of Classification Search
None
See application file for complete search history.

(56) References Cited

U.S. PATENT DOCUMENTS

| 6,654,483 B1* | 11/2003 | Bradski ............. G06K 9/00335 348/169 |
| 8,114,172 B2 | 2/2012 | Givon |
| 2006/0018516 A1 | 1/2006 | Masoud et al. |
| 2009/0297052 A1 | 12/2009 | Xu et al. |
| 2010/0202663 A1 | 8/2010 | Kim et al. |
| 2011/0289455 A1 | 11/2011 | Reville et al. |
| 2012/0027252 A1* | 2/2012 | Liu ................... G06K 9/00355 382/103 |
| 2012/0027263 A1* | 2/2012 | Liu ................... G06K 9/00335 382/107 |

FOREIGN PATENT DOCUMENTS

| EP | 2613281 A1 | 7/2013 |
| KR | 10-2012-0089948 A | 8/2012 |

OTHER PUBLICATIONS

Davis, J.W.; "Hierarchical Motion History Images for Recognizing Human Motion"; Detection and Recognition of Events in Video; 2001; 7 pages total; DOI 10.1109/Event.2001/938864.

(Continued)

*Primary Examiner* — Bernard Krasnic
(74) *Attorney, Agent, or Firm* — Sughrue Mion, PLLC

(57) ABSTRACT

An image processing apparatus includes: a camera configured to generate a captured image by capturing motion of an object; an image processor configured to process the captured image; a storage configured to store a predetermined information which is common data included in common in a plurality of motion history images (MHI) obtained by capturing respectively the motions by a predetermined form; and a controller configured to determine that a form of the motion by the object within the captured image corresponds to the predetermined form if it is determined that MHI data of the captured image includes the predetermined information.

14 Claims, 12 Drawing Sheets

(56) References Cited

OTHER PUBLICATIONS

Jeremy Paul Svendsen, "Analysis of Motor Skills in Subjects with Down's Syndrome using Computer Vision Techniques", In: the Degree of Master of Applied Science in the Department of Electrical and Computer Engineering of the University of Victoria, Jun. 2, 2010, 82 pages.

Communication, Issued by the International Searching Authority, Issued Jan. 16, 2015, in counterpart International Application No. PCT/KR2014/008863.

* cited by examiner

IMAGE PROCESSING APPARATUS AND CONTROL METHOD USING MOTION HISTORY IMAGES

CROSS-REFERENCE TO RELATED APPLICATION

This application claims priority from Korean Patent Application No. 10-2013-0122706, filed on Oct. 15, 2013 in the Korean Intellectual Property Office, the disclosure of which is incorporated herein by reference in its entirety.

BACKGROUND

1. Field

Apparatuses and methods consistent with the exemplary embodiments relate to an image processing apparatus which processes video data to be displayed as an image and a control method thereof, and more particularly to an image processing apparatus which is trained in a behavior pattern based on a plurality of motion histories collected through a camera and determines a user's behavior pattern based on training results, and a control method thereof.

2. Description of the Related Art

An image processing apparatus processes a video signal/video data received from an exterior, through various imaging processes. The image processing apparatus displays the processed video signal as an image on its own display panel, or outputs the processed video signal to a separate display apparatus so that the processed video signal can be displayed as an image on the display apparatus having a panel. That is, the image processing apparatus may include a panel capable of displaying an image or may not include the panel as long as it can process the video signal. As an example of the former case, there is a television (TV). Further, as an example of the latter case, there is a set-top box.

With development of technology, various functions of the image processing apparatus have continuously been added and extended. For example, the image processing apparatus may determine a user's motion or pattern within an image containing a user who is present in front thereof, taken through a camera, and perform a preset function corresponding to the determined motion command.

To determine such a motion command, various algorithms may be used. For example, there is a modeling-based analysis method, in which a three-dimensional (3D) or two-dimensional (2D) image is modeled for a body structure of a human and motion information is extracted and analyzed from modeling results, to thereby recognize a motion. In this case, a precise recognition result is expected, but it may be not easy to practically apply this method to a general TV or the like since a data throughput is large and its realization has a high level of difficulty. Also, the modeling-based analysis method requires photographing based on one or more 3D cameras or a plurality of 2D cameras.

Accordingly, a method and structure for more analyzing and determining a user's motion command through one 2D camera are needed.

SUMMARY

The foregoing and other aspects may be achieved by an image processing apparatus including: a camera configured to generate captured image by capturing motion of an object; an image processor configured to process the captured image; a storage configured to store a predetermined information which is common data included in common in a plurality of motion history images (MHI) obtained by capturing respectively the motions by a predetermined form; and a controller configured to determine that a form of the motion by the object within the captured image corresponds to the predetermined form if it is determined that MHI data of the captured image includes the predetermined information.

The controller may be further configured to divide an entire pixel region of the MHI into a plurality of divided pixel regions, calculate operation data respectively of the divided pixel regions with one of a plurality of predetermined region patterns, and obtain the MHI data based on the operation data of the respective divided pixel regions.

The controller may be further configured to obtain the MHI data by connecting the operation data of the respective divided pixel regions in a row.

The predetermined region pattern may include a plurality of divisional regions arranged in a matrix, which are divided into a first region and a second region respectively including at least one non-overlapping divisional region from among the plurality of divisional regions, and at least one of the plurality of the predetermined region patterns may differ from at least one other region pattern in at least one of a dividing shape of the divisional region and a distinguishing shape between the first and second regions.

The divisional regions may have respective sizes corresponding to one or more pixels of the MHI.

The region pattern may include a plurality of divisional regions arranged in a matrix, which are divided into a first region and a second region respectively including at least one non-overlapping divisional region from among the plurality of divisional regions, and the controller may be configured to calculate the operation data of each pixel region by selectively applying a binary value in accordance with comparison results between an average pixel value of the first region and an average pixel value of the second region.

The controller may be further configured to calculate edge information about pixels in the plurality of the divisional regions and to add the edge information to the operation data.

The controller may be further configured to normalize the MHI of the captured image to have a preset size or resolution, and to calculate the MHI data from the normalized MHI. The foregoing and other aspects may be achieved by a method of controlling an image processing apparatus, the method including: obtaining and storing a predetermined information, the predetermined information being common data included in common in a plurality of motion history images (MHI) obtained by capturing respectively motions by a predetermined form; receiving a captured image from a camera, the captured image is generated by the camera capturing the motion of an object; and determining that a form of the motion by the object within the captured image corresponds to the predetermined form if it is determined that MHI data of the captured image includes the predetermined information.

The obtaining and storing the predetermined information may include dividing an entire pixel region of the MHI into a plurality of divided pixel regions; calculating operation data respectively of the divided pixel regions with one of a plurality of predetermined region patterns; and obtaining the MHI data based on the operation data of the respective divided pixel regions.

The MHI data may be generated by connecting the operation data of the respective divided pixel regions in a row.

The predetermined region pattern may include a plurality of divisional regions arranged in a matrix, which are divided into a first region and a second region respectively including at least one non-overlapping divisional region from among the plurality of divisional regions, and at least one of the plurality of the predetermined region patterns may differ from at least one other region pattern in at least one of a dividing shape of the divisional region and a distinguishing shape between the first and second regions.

The divisional regions may have respective sizes corresponding to one or more pixels of the MHI.

The region pattern may include a plurality of divisional regions arranged in a matrix, which are divided into a first region and a second region respectively including at least one non-overlapping divisional region from among the plurality of divisional regions, and the calculating the operation data may include calculating the operation data of each pixel region by selectively applying a binary value in accordance with comparison results between an average pixel value of the first region and an average pixel value of the second region.

The calculating the operation data may include calculating edge information about pixels in the plurality of the divisional regions and adding the edge information to the operation data.

The determining may include normalizing the MHI of the captured image to have a preset size or resolution, and calculating the MHI data from the normalized MHI.

BRIEF DESCRIPTION OF THE DRAWINGS

The above and/or other aspects will become apparent and more readily appreciated from the following description of exemplary embodiments, taken in conjunction with the accompanying drawings, in which.

DETAILED DESCRIPTION OF EXEMPLARY EMBODIMENTS

Figure 1:
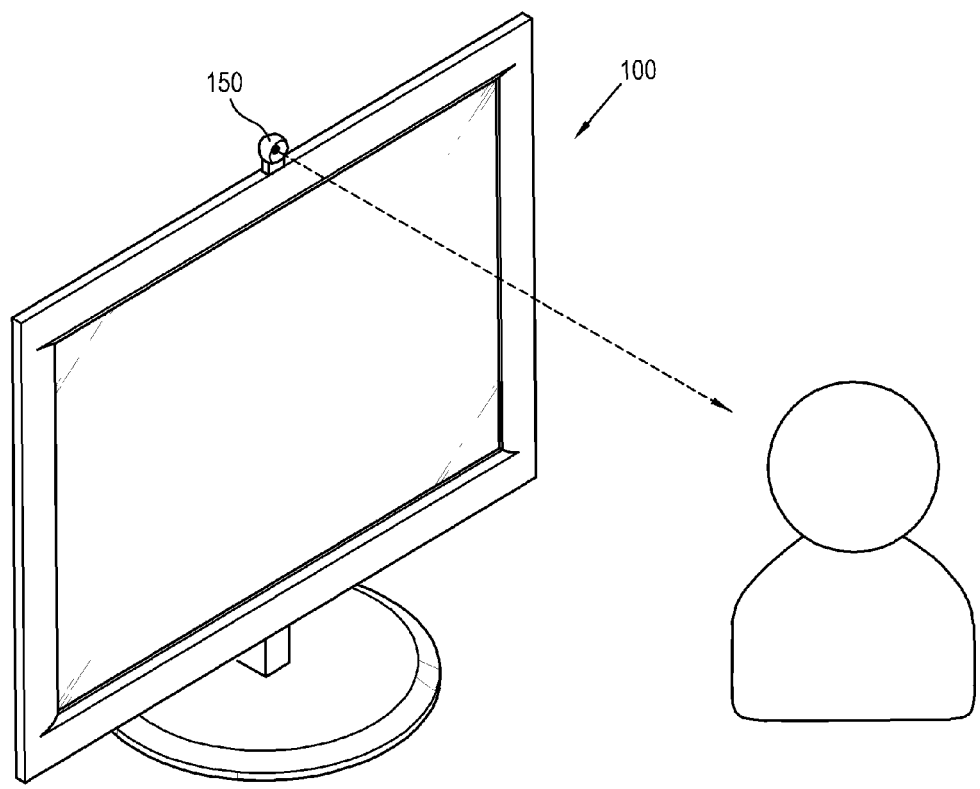
FIG. 1 shows a perspective view of an image processing apparatus according to a first exemplary embodiment.

Below, exemplary embodiments will be described in detail with reference to accompanying drawings so as to be more easily realized by a person having ordinary knowledge in the art. Exemplary embodiments may be embodied in various forms without being limited to the exemplary embodiments set forth herein. Descriptions of well-known parts are omitted for clarity, but this does not mean that the omitted parts are unnecessary for realization of apparatuses or systems to which the exemplary embodiments are applied. Like reference numerals refer to like elements throughout.

FIG. 1 shows a perspective view of an image processing apparatus according to a first exemplary embodiment. In this exemplary embodiment, the image processing apparatus 100 is achieved by a display apparatus having a structure capable of displaying an image by itself. However, an exemplary embodiment may be applied to even an apparatus that cannot display an image by itself like a set-top box, and in this case the image processing apparatus 100 is locally connected to a separate external display apparatus so that the image can be displayed on the external display apparatus.

As shown in FIG. 1, the display apparatus 100 according to this exemplary embodiment processes video data and displays an image based on the video data, thereby offering the image to a frontward user. As a non-limiting example of the display apparatus 100, there is a television (TV). In this exemplary embodiment, the TV will be described as an example of the display apparatus 100.

In accordance with various events generated by a user, the display apparatus 100 carries out a preset operation or function corresponding to the event. As one of the events, it is sensed and analyzed what motion a user who is present in front of the display apparatus 100 makes. To this end, the display apparatus 100 include a camera 150 for capturing external environments.

The display apparatus 100 analyzes an image captured by the camera 150, and determines what type of motion a user makes on the captured image. If the type of motion is determined to be a motion command, the display apparatus 100 performs a preset function corresponding to the determined motion command. As a non-limiting example, if it is determined through an image captured over a predetermined time that a user makes a motion of raising his/her right hand up, the display apparatus 100 turns a volume of the display up by a predetermined level. On the other hand, if it is determined through the captured image that a user makes a motion of moving his/her right hand in a rightward direction, the display apparatus 100 switches to the next channel.

Below, the configurations of the display apparatus 100 are as follows.

Figure 2:
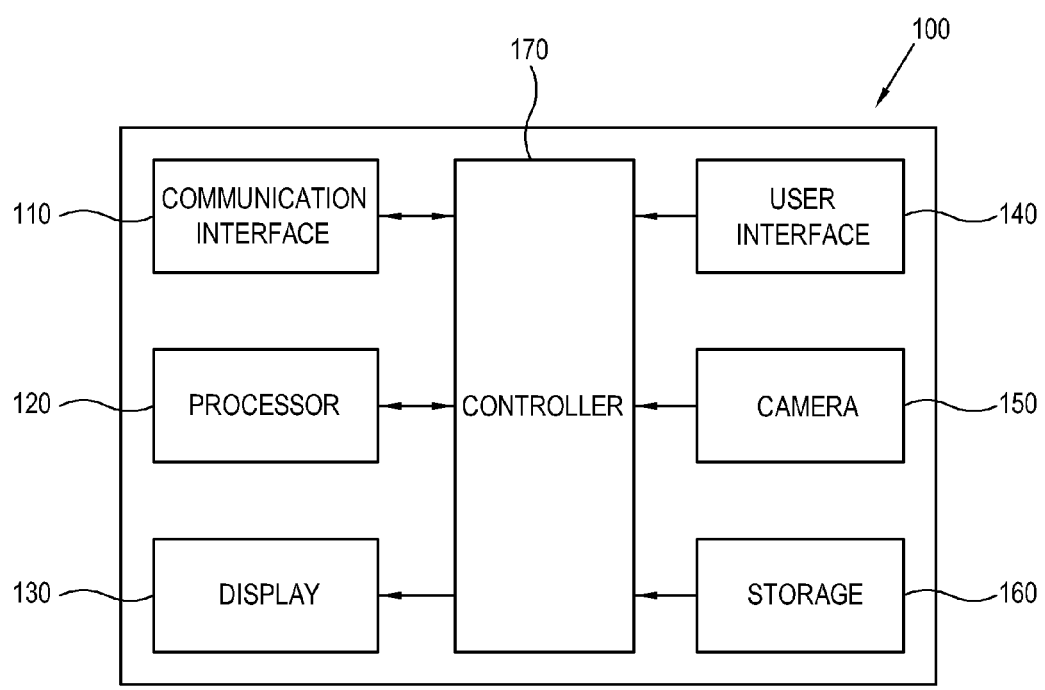
FIG. 2 is a block diagram of a display apparatus in FIG. 1.

FIG. 2 is a block diagram of the display apparatus 100.

As shown in FIG. 2, the display apparatus 100 includes a communication interface 110 which performs communication with one or more exterior devices, such as a server, to transmit/receive data/a signal, a processor 120 which processes data received in the communication interface 110 in accordance with preset processes, a display 130 which displays video data as an image if data processed in the processor 120 is the video data, a user interface 140 which is for a user's input, a camera 150 which captures external environments of the display apparatus 100, a storage 160 which stores data/information, and a controller 170 which controls general operations of the display apparatus 100.

The communication interface 110 transmits/receives data so that interactive communication can be performed between the display apparatus 100 and a server or an external device (not shown). The communication interface 110 may access the server or the external device (not shown) through wide/local area networks or locally in accordance with preset communication protocols.

The communication interface 110 may be achieved by connection ports according to devices or an assembly of connection modules, in which the protocol for connection or the external device for connection is not limited to one kind or type. The communication interface 110 may be a built-in device of the display apparatus 100, or the entire or a part thereof may be added to the display apparatus 100 in the form of an add-on or dongle type.

The communication interface 110 transmits/receives a signal in accordance with protocols designated according to the connected devices, in which the signals can be transmitted/received based on individual connection protocols with regard to the connected devices. In the case of video data, the communication interface 110 may transmit/receive the signal bases on various standards such as a radio frequency (RF) signal, composite/component video, super video, Syndicat des Constructeurs des Appareils Radiorécepteurs et Téléviseurs (SCART), high definition multimedia interface (HDMI), display port, unified display interface (UDI), or wireless HD, etc.

The processor 120 performs various processes with regard to data/a signal received in the communication interface 110. If the communication interface 110 receives the video data, the processor 120 applies an imaging process to the video data and the video data processed by this process is output the display 130, thereby allowing the display 130 to display an image based on the corresponding video data. If the signal received in the communication interface 110 is a broadcasting signal, the processor 120 extracts video, audio and appended data from the broadcasting signal tuned to a certain channel, and adjusts an image to have a preset resolution, so that the image can be displayed on the display 130.

There is no limit to the kind of imaging processes to be performed by the processor 120. For example, there may be decoding corresponding to an image format of the video data, de-interlacing for converting the video data from an interlace type into a progressive type, scaling for adjusting the video data to have a preset resolution, noise reduction for improving image qualities, detail enhancement, frame refresh rate conversion, etc.

The processor 120 may perform various processes in accordance with the kinds and attributes of data, and thus the process to be implemented in the processor 120 is not limited to the imaging process. Also, processor 120 is not limited to processing only the data received in the communication interface 110. For example, the processor 120 may process a user's utterance through a preset voicing process when the user interface 140 receives the corresponding utterance.

The processor 120 may be achieved by an image processing board (not shown) where a system-on-chip where various functions are integrated or an individual chip-set capable of independently performing each process is mounted on a printed circuit board. The processor 120 may be built-in the display apparatus 100.

The display 130 displays the video signal/the video data processed by the processor 120 as an image. The display 130 may be achieved by various display types such as liquid crystal, plasma, a light-emitting diode, an organic light-diode, a surface-conduction electron-emitter, a carbon nanotube and a nano-crystal, but not limited thereto.

The display 130 may additionally include an appended element in accordance with its types. For example, in the case of the liquid crystal type, the display 130 may include a liquid crystal display (LCD) panel (not shown), a backlight unit (not shown) which emits light to the LCD panel, a panel driving substrate (not shown) which drives the panel (not shown), etc.

The user interface 140 transmits various preset control commands or information to the controller 170 in accordance with a user's control or input. The user interface 140 receives various events that occur in accordance with a user's intentions and transmits it to the controller 170. Here, the events that occur by a user may have various forms, and may for example include a user's control of a remote controller, utterance, etc.

The camera 150 captures external environments of the display apparatus 100, in particular, a user's figure, and transmits a captured result to the processor 120 or the controller 170. The camera 150 in this exemplary embodiment offers the captured image of capturing a user's figure by a two-dimensional (2D) capturing method to the processor 120 or the controller 170, so that the controller 170 can specify a user's shape or figure within a video frame of the captured image.

The storage 160 stores various data under control of the controller 170. The storage 160 may be achieved by a nonvolatile memory such as a flash memory, a hard disk drive, etc. so as to retain data regardless of power on/off of the system. The storage 150 is accessed by the controller 170 so that previously stored data can be read, recorded, modified, deleted, updated, and so on.

The controller 160 may be achieved by a central processing unit (CPU), and controls operations of general elements of the display apparatus 100, such as the processor 120, in response to occurrence of a predetermined event. In this exemplary embodiment, the controller 170 receives a captured image from the camera 150 and determines what motion a user makes by analyzing a video frame of the captured image. The controller 160 controls a preset operation to be performed corresponding to the motion that a user makes, based on the determination results.

Like this, to determine the mode of the motion a user makes on a captured image, various algorithms may be used. In this exemplary embodiment, a concept of motion history image (MHI) is basically used to determine the motion mode. However, exemplary embodiments are not limited to the use of MHI.

Below, the concept of MHI will be described in brief.

Figure 3:
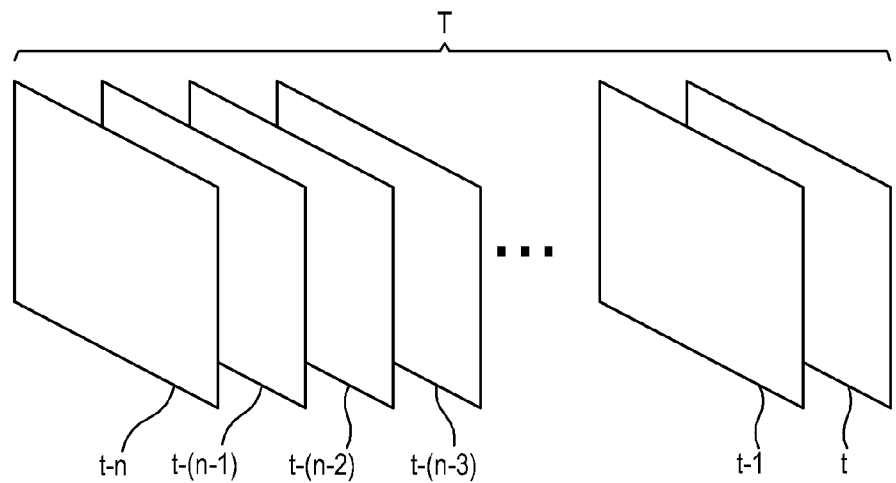
FIG. 3 shows a predetermined number of video frames of a captured image are arranged in a row in accordance with a lapse of time.

FIG. 3 shows an example showing that a predetermined number of video frames of a captured image are arranged in a row in accordance with a lapse of time.

As shown in FIG. 3, an image captured by the camera 150 for a predetermined time T includes a plurality of video frames sequentially arranged with regard to time. If the last video frame is referred to as t, a video frame previous to t by one unit of the video frame is t−1; a video frame previous to t by two units of the video frame is t−2; and a video frame previous to t by n units of the video frame is t−n. Here, n is a constant.

In other words, within the image captured during the time section T, the initial video frame is t−n; and the last video frame is t.

If these video frames contain a predetermined object, a motion of the object may appear corresponding to a lapse of time.

Figure 4:
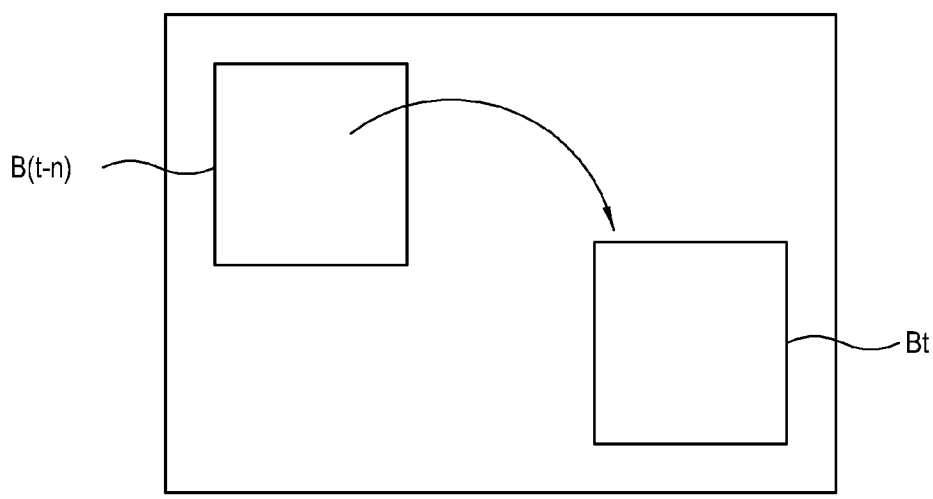
FIG. 4 shows movement of an object, which appears when the video frames of FIG. 3 are superposed.

FIG. 4 shows movement of an object, which appears when the video frames of FIG. 3 are superposed;

As shown in FIG. 4, when the video frames corresponding to the time section T are superposed with regard to time, it seems that the object moves in these video frames in accordance with the lapse of time. If a position of the object in the initial video frame t−n is referred to as B(t−n) and a position of the object in the video frame t is referred to as Bt, the object may move from B(t−n) to Bt along a curved trace from a upper left to a lower right in the video frame.

In this case, an MHI extracted from the video frames during the time section T is an image generated by accumulating differential values with respect to pixels between the respective video frames during the corresponding time section.

Figure 5:
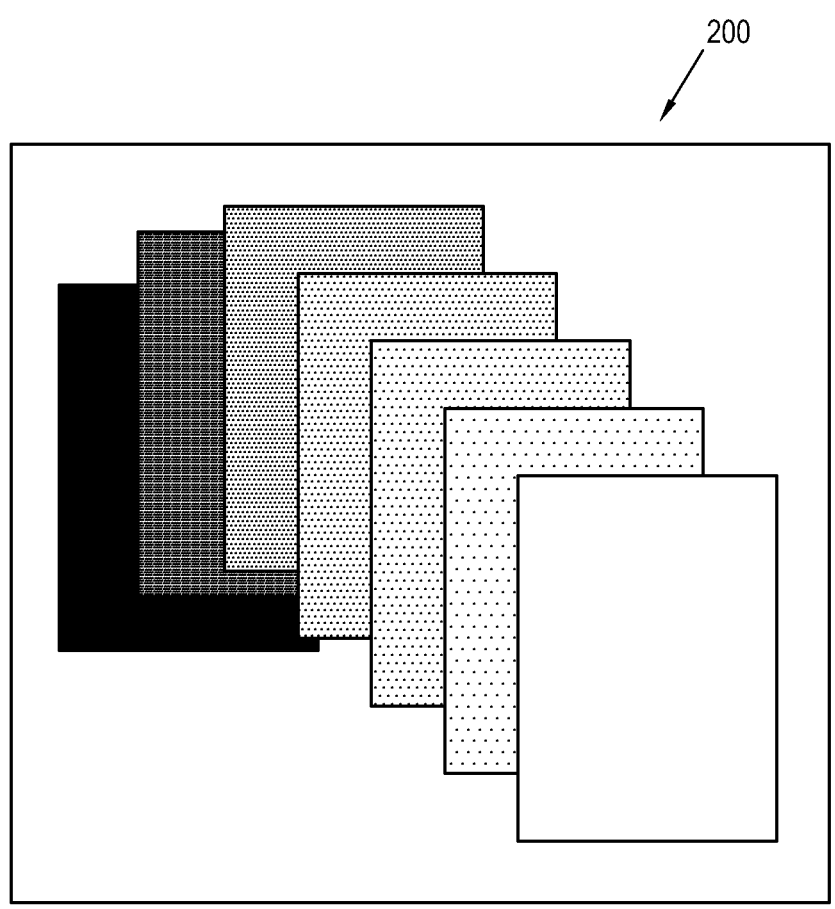
FIG. 5 shows a schematic view of a motion history image (MHI) generated corresponding to movement of an object, which appears as shown in FIG. 3.

FIG. 5 shows a schematic view of a motion history image (MHI) 200 generated corresponding to movement of an object, which appears as shown in FIG. 3.

For description of the principle, the MHI 200 is simplified in the drawings. However, in practice, the MHI is complicatedly represented with pixels.

As shown in FIG. 5, the MHI 200 is an image showing light and shade, which represents a degree of variation in motion with respect to space and time. The light and shade of an image that gets brighter are proportional to an elapsed time. Through the MHI 200, it is possible to determine temporal and spatial information about where the motion starts, and in what direction and for how much time the motion occurs.

Here, each pixel value of pixels that constitute the MHI 200 may be calculated based on the following expression.

$$H_\tau(x, y, t) = \begin{cases} \tau & \text{if } D(x, y, t) = 1 \\ \max(0, H_\tau(x, y, t-1) - 1) & \text{otherwise} \end{cases}.$$

The above expression was defined for the MHI 200 by Aaron F. Bobick and James W. Davis. This is well-known, and thus detailed descriptions thereof will be omitted.

Where, $D(x,y,t)$ is a binary pixel value at $(x,y)$ coordinates on a differential image between the video frame t−1 and the video frame t. $\tau$ is a time stamp, which is a preset value for representing a difference between a previous video frame and a current video frame and experimentally determined between 0 and 255. $H_\tau(x,y,t)$ is a pixel value at $(x,y)$ coordinates on the MHI 200 in the $\tau$ time stamp of the time t.

In the foregoing expression, the last constant of 1 in $H_\tau(x,y,t-1)-1$ may be replaced by an arbitrary constant of k in accordance with design methods. That is, $H_\tau(x,y,t-1)-1$ in the foregoing expression may be expressed as $H_\tau(x,y,t-1)-k$.

$D(x,y,t)$ is set up by giving 1 to a pixel when there is a difference between a previous image and a current image, and giving 0 to the corresponding pixel when there is no difference. If an object moves from the upper left to the lower right as shown in FIG. 4, the MHI 200 generated by the foregoing expression is represented with the brightest value for the latest motion and with a darker value for a more previous motion. This is because differential values between pixel values with respect to a predetermined pixel are accumulated as differential imaged between temporally near two video frames are accumulated.

Accordingly, the motion of the object during a certain time section T can be represented on one image, i.e., the MHI 200.

In connection with the MHI based on the foregoing principle, the present exemplary embodiment includes a training process and a determination process. The training process is to extract respective MHIs from motions performed in the same pattern, and obtain and store a motion command corresponding to a certain MHI through training based on the plurality of extracted MHIs. The determination process is to compare the MHI of the captured image with the results obtained and stored by the training process, and determine which motion command the MHI corresponds to. That is, the training process specifies MHI data about the motion of a certain pattern, and the determination process determines which command the motion of a targeted captured image corresponds to, based on the results of the training process.

However, in the training process, it is not easy to determine what contents the MHI data of a certain motion command has, in other words to receive training in the MHI data of the certain motion command, in the following respects.

For example, in a case that a user raises a user's hand, a speed of completing the motion, an area of activity, a trace of movement, etc. may be different depending on the user, or may be different in accordance with the number of motions even through the motions are performed by one user. Therefore, if one motion of a certain user is captured and if the training process is performed with the MHI data of only that captured image, it is not easy to determine the motion mode on the captured image targeted in the following determination process.

Accordingly, the display apparatus 100 performs the training process to respectively generate MHIs from a plurality of first captured images for motions individually performed according to a first mode and derive common MHI data from MHI data corresponding to the plurality of generated MHIs. The display apparatus 100 stores the derived MHI data as common information corresponding to a corresponding motion command.

Then, the display apparatus 100 performs the determination process to extract the MHI data of a second captured image targeted for the determination. If the extracted MHI data includes the common information stored in the previous training process, the display apparatus 100 determines that the motion occurring on the second captured image corresponds to the first mode.

With this method, even if the captured image involves the motions made in various forms according to users, the determination process determines the command of the corresponding motion. That is, the training process extracts the common information included in common with regard to a certain motion command and sets up it as a reference, and therefore the determination process can determine whether each of the motions performed in various forms corresponds to the certain mode in accordance with whether it contains the common information.

Below, a structure of training in a motion mode on a captured image will be described in detail according to this exemplary embodiment. In this exemplary embodiment, the training process analyzes a plurality of images that contain motions identically having a certain mode, and operates to acquire the common information corresponding to that mode.

Figure 6:
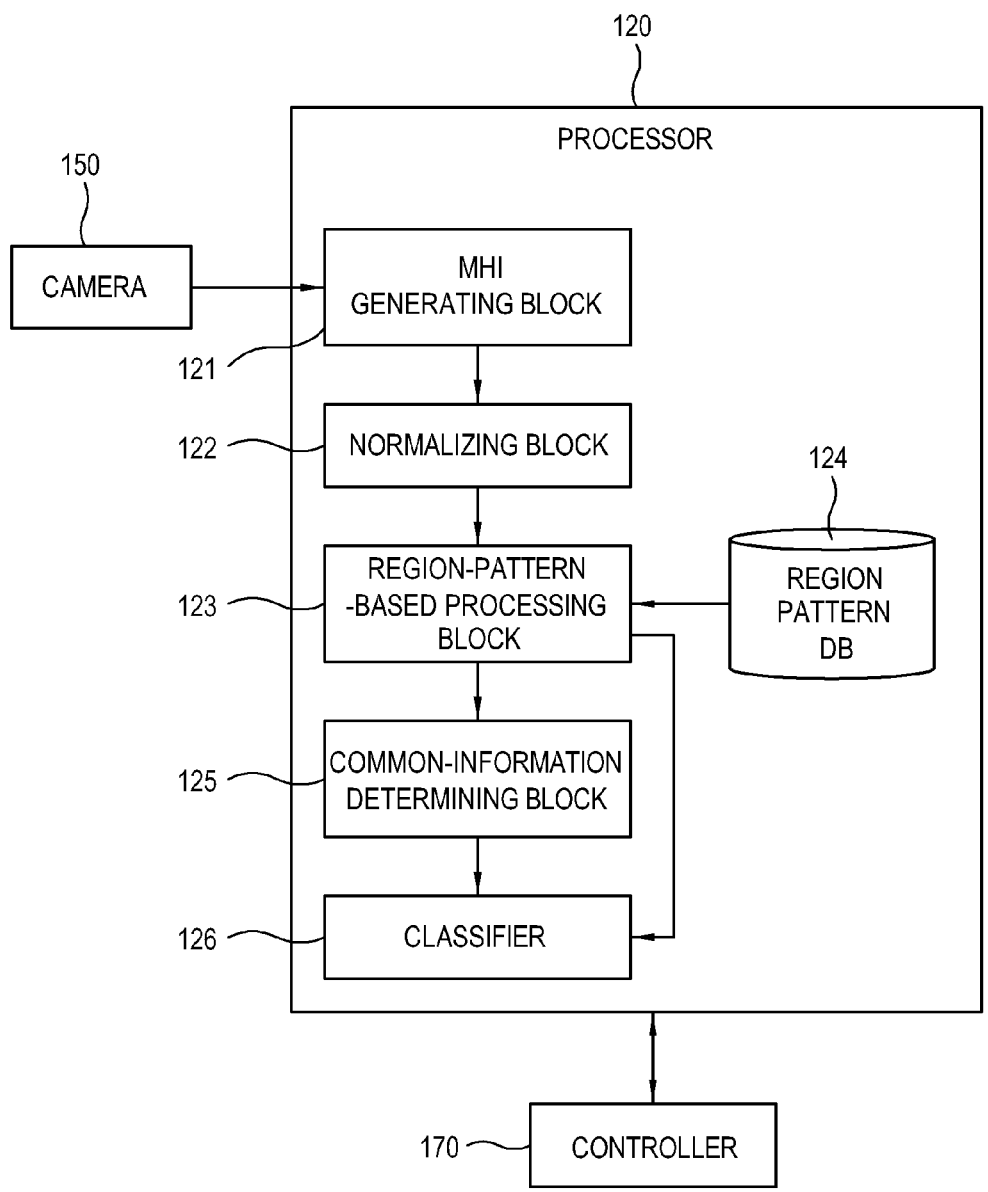
FIG. 6 is a block diagram of a processor in the display apparatus of FIG. 1 according to an exemplary embodiment.

FIG. 6 is a block diagram of the processor 120 according to an exemplary embodiment.

As shown in FIG. 6, the processor 120 according to an exemplary embodiment includes a plurality of modules or blocks 121, 122, 123, 124, 125 and 126 for processing the captured image received from the camera 150.

These blocks 121, 122, 123, 124, 125 and 126 are sorted with respect to functions for convenience, and do not limit the realization of the processor 120. These blocks 121, 122, 123, 124, 125 and 126 may be achieved by hardware, software, or a combination of the two. The respective blocks 121, 122, 123, 124, 125 and 126 that constitute the processor 120 may perform their operations independently. Alternatively, the processor 120 may be not divided into individual blocks 121, 122, 123, 124, 125 and 126 and perform the whole operations in sequence. Also, the operations of the processor 120 may be performed under control of the controller 170.

The processor 120 includes an MHI generating block 121, a normalizing block 122, a region-pattern-based processing block 123, a region pattern DB 124, a common-information determining block 125, and a classifier 126.

Below, operations of the respective blocks 121, 122, 123, 124, 125 and 126 will be described with respect to one video frame of an captured image transmitted from the camera 150.

When a captured image including a plurality of video frames corresponding to a predetermined time section is received from the camera 150, the MHI generating block 121 converts the corresponding captured image into an MHI. Here, the MHI generating block 121 sequentially receives the plurality of captured images, which contain motions performed by an identical mode, from the camera 150 during the training process, but not limited thereto. Alternatively, the MHI generating block 121 may employ not the camera 150 but another method to receive the plurality of captured images needed for the training process. For example, the MHI generating block 121 may receive a previously stored image from another device.

As the plurality of captured images are sequentially received, the MHI generating block 121 converts the respective captured images into the MHIs and sequentially transmits them to the normalizing block 122.

The normalizing block 122 normalizes the MHIs received from the MHI generating block 121 to have preset sizes or resolutions, respectively. The normalizing block 122 sets up the plurality of MHIs to include the region where the motion occurs among the entire pixel regions of each MHI, while normalizing the plurality of MHIs to have the same size.

The region-pattern-based processing block 123 divides the entire pixel regions of the MHI received from the normalizing block 122 into preset region patterns, and respectively applies operations for the corresponding region patterns to the divided regions, thereby deriving primary MHI binary data based on the corresponding region pattern. Further, the region-pattern-based processing block 123 applies the same process with another region pattern and thus derives secondary MHI binary data based on the corresponding region pattern.

The region-pattern-based processing block 123 performs such process with all the plurality of preset region patterns, and derives final MHI data of an MHI from the MHI binary data derived according to the region patterns. Here, the MHI data may be for example formed by connecting the MHI binary data according to the respective region patterns in a row, which is achieved by a series of binary codes.

More detailed operations and region patterns of the region-pattern-based processing block 123 will be described later.

The region pattern DB 124 stores the plurality of preset region patterns, and sequentially offers the plurality of region patterns to the region-pattern-based processing block 123 in accordance with processing operations of the region-pattern-based processing block 123

The common-information determining block 125 gathers the MHI data corresponding to the MHIs sequentially received from the region-pattern-based processing block 123. The common-information determining block 125 extracts the common information from the plurality of gathered MHI data. The common-information determining block 125 designates the extracted common information to a certain motion command and stores it. Detailed operations of the common-information determining block 125 for extracting the common information from the plurality of MHI data will be described later.

With this structure, the common information corresponding to the certain motion command is derived during the training process.

Meanwhile, in the determination process, a target image is processed by the MHI generating block 121, the normalizing block 122, the region-pattern-based processing block 123, and the region pattern DB 124, and details conform to the training process. However, the common-information determining block 125 is not used during the determination process, and the MHI data processed by the region-pattern-based processing block 123 is transmitted to the classifier 126.

During the determination process, the classifier 126 determines what motion command the motion in the image corresponds to, based on the MHI data transmitted from the region-pattern-based processing block 123. The classifier 126 determines whether the target MHI data includes the common information derived during the training process by the common-information determining block 125, and determines that the motion in the image as a source of the MHI data corresponds to the motion command if it is determined that the MHI data includes the common information.

The common information is designated and stored according to the motion commands by the common-information determining block 125 and stored in the storage 160 (refer to FIG. 2) so as to be referred to by the classifier 126 during the determination process.

Models employed in the classifier 126 may include, as non-limiting examples, various machine learning algorithms such as Bayes classifier, linear support vector machine (SVM), Kernel based SVM, neural network, Adaboost etc. These algorithms are publicly known, and thus detailed descriptions thereof will be omitted. For example, if a quick operation is required for the detection, the classifier 126 may employ the linear SVM.

Below, the region pattern will be described.

Figure 7:
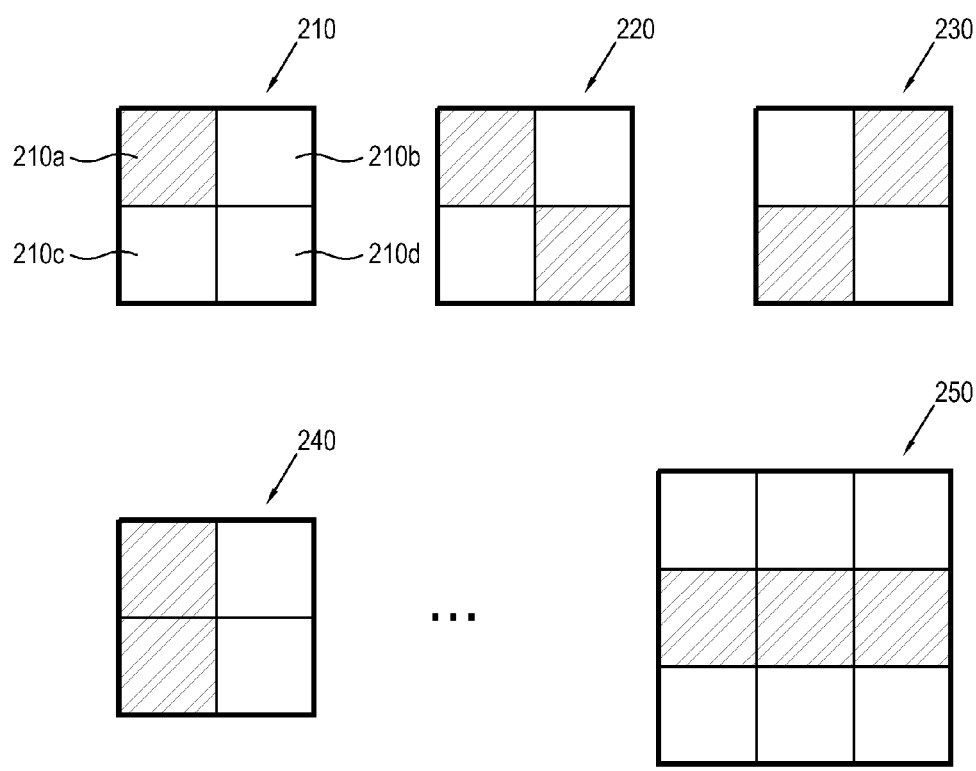
FIG. 7 shows region patterns referred to by the processor of FIG. 6 according to an exemplary embodiment.

FIG. 7 shows region patterns 210, 220, 230, 240 and 250 according to an exemplary embodiment.

As shown in FIG. 7, the plurality of region patterns 210, 220, 230, 240 and 250 are different in shape from one another. The shapes of the region patterns 210, 220, 230, 240, 250 may be varied depending on designs, and thus there is no limit to its detailed shapes. Further, the region patterns 210, 220, 230, 240, and 250 may be divided into a plurality of divisional regions.

For example, region pattern 210 is divided into a plurality of divisional regions 210a, 210b, 210c and 210d arranged in a matrix form, and each of the divisional regions 210a, 210b, 210c and 210d has a size corresponding to one or more pixels of the MHI. Here, the number of pixels of the MHI, to be included in one divisional region 210a, 210b, 210c or 210d, is not limited but may vary depending on design.

Further, region pattern 210 includes a first region including a part among the plurality of divisional regions 210a, 210b, 210c and 210d, and a second region including the other parts. In these drawings, the first region is hatched, while the second region is represented by a white background without being hatched, thereby distinguishing them.

The region patterns 210, 220, 230, 240, 250 may be divided in the form of squares of 2×2, 3×3, 4×4, etc. or rectangles of 1×2, 2×3, etc. Region patterns may alternatively be divided into non-rectangular divisional regions. The region pattern 210, 220, 230, 240, 250 sorts such divided regions into the first region and the second region, in which there may be various sorting methods. However, the plurality of region patterns 210, 220, 230, 240 and 250 are different in at least one of a dividing shape of the divisional region, and a designating shape of the first and second regions.

For example, the first region pattern 210 includes four divisional regions 210a, 210b, 210c and 210d divided in the form of 2×2. Here, the first region pattern 210 is set up so that the first region can include the first divisional region 210a and the second region can include the other divisional regions 210b, 210c and 210d.

Below, a method of performing the operations according to the region patterns with respect to the MHI and deriving the MHI data will be described.

Figure 8:
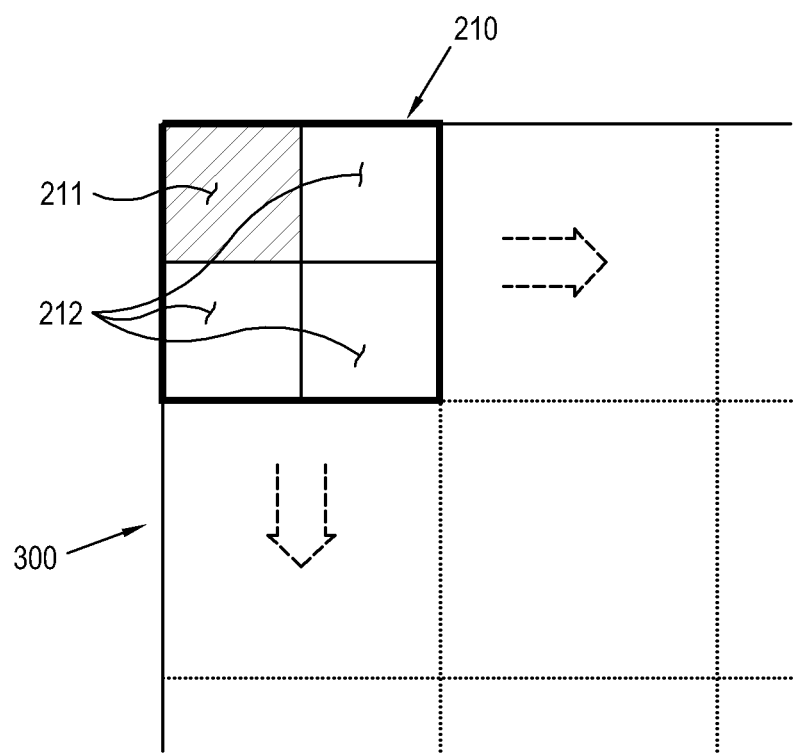
FIG. 8 shows illustrates extracting MHI data corresponding to a first region pattern from the MHI by the first region pattern among the plurality of region patterns shown in FIG. 7.

FIG. 8 shows a principle of deriving the MHI data corresponding to the first region pattern 210 from the MHI 300 by the first region pattern 210 of FIG. 7.

As shown in FIG. 8, the region-pattern-based processing block 123 (refer to FIG. 6) performs masking on an upper left region of the MHI 300 with the first region pattern 210. The masking refers to that the first region pattern 210 is placed on a region of the MHI 300.

The region-pattern-based processing block 123 calculates an average pixel value of pixels of the MHI 300 included in the first region 211 of the first region pattern 210, and an average pixel value of pixels of the MHI 300 included in the second region 212. If the average pixel value of the pixels of the MHI 300 included in the first region 211 is referred to as a1 and the average pixel value of the pixels of the MHI 300 included in the second region 212 is referred to as a2, the region-pattern-based processing block 123 compares a1 and a2.

The region-pattern-based processing block 123 gives 1 to the making region of the MHI 300 if a1≥a2, and gives 0 to it if a1<a2. In accordance with designs, 0 may be given to the masking region of the MHI 300 if a1≥a2, and 1 may be given to it if a1<a2.

After these operations, the region-pattern-based processing block 123 moves a masking position of the first region pattern 210 to another pixel region of the MHI 300 where the foregoing operations has not been performed, and then performs the operation in the same manner. Thus, the region-pattern-based processing block 123 performs the operation by the first region pattern 210 with respect to the entire pixel regions of the MHI 300 and obtains a series of binary codes. These binary codes are the MHI data corresponding to the first region pattern 210 by the first region pattern 210.

Figure 9:
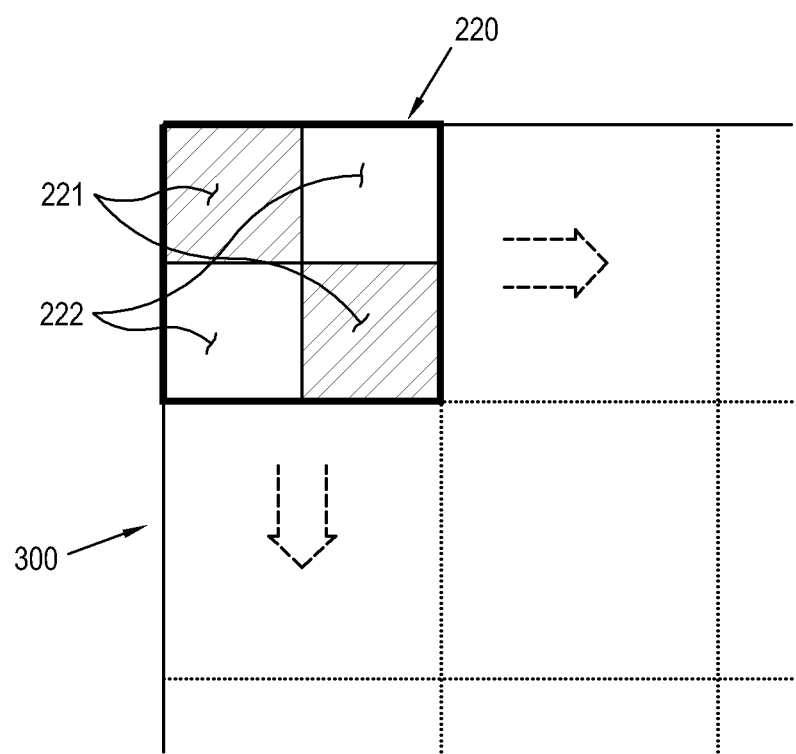
FIG. 9 illustrates extracting MHI data corresponding to a second region pattern from the MHI by the second region pattern among the plurality of region patterns shown in FIG. 7.

FIG. 9 shows a principle of deriving the MHI data corresponding to the second region pattern 220 from the MHI 300 by the second region pattern 220 of FIG. 7.

As shown in FIG. 9, the region-pattern-based processing block 123 (refer to FIG. 6) performs masking an upper left region of the MHI 300 with the second region pattern 220. The region-pattern-based processing block 123 calculates an average pixel value a1 of pixels of the MHI 300 included in the first region 221 of the second region pattern 220, and an average pixel value a2 of pixels of the MHI 300 included in the second region 222.

Like the first region pattern 210, the region-pattern-based processing block 123 compares a1 and a2 with each other. The region-pattern-based processing block 123 gives 1 to the masking region of the MHI 300 if a1≥a2, and gives 0 if a1<a2.

If these operations are completed, the region-pattern-based processing block 123 moves a masking position of the second region pattern 220 to another pixel region of the MHI 300 where the foregoing operations have not been performed, and then performs the operation in the same manner. Thus, the region-pattern-based processing block 123 performs the operation by the second region pattern 220 with respect to the entire pixel regions of the MHI 300 and obtains a series of binary codes. These binary codes are the MHI data corresponding to the second region pattern 220 by the second region pattern 220.

With this method, the region-pattern-based processing block 123 performs operations with all the region patterns 210, 220, 230, 240 and 250 with regard to the MHI 300. Here, the operations with the region patterns 210, 220, 230, 240 and 250 are performed with regard to all the pixels of the MHI 300 regardless of the shapes and patterns of the region patterns 210, 220, 230, 240 and 250. The normalization of the MHI 300 and the settings of the region patterns 210, 220, 230, 240 and 250 are determined within the range satisfying the foregoing.

Figure 10:
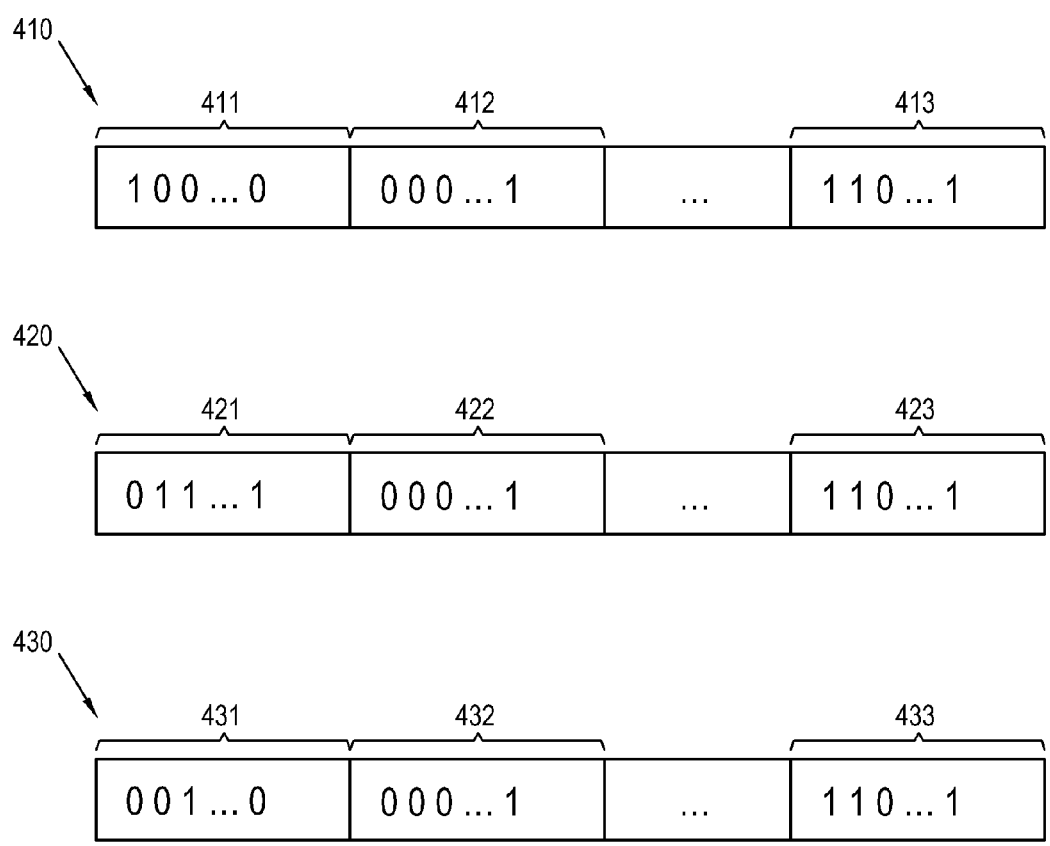
FIG. 10 shows MHI data generated based on the MHI data corresponding to each region pattern shown in FIG. 7.

FIG. 10 shows final MHI data generated based on the MHI data corresponding to each region pattern.

When the operations with all the region patterns of the MHI are completed, the region-pattern-based processing block 123 (refer to FIG. 6) derives final MHI data 410 of the corresponding MHI based on the MHI data 411, 412 and 413 according to the respective region patterns. There may be various methods of deriving the MHI data 410 of the entire MHI from the MHI data 411, 412 and 413 according to the respective region patterns. For example, a series of binary codes connecting the MHI data corresponding to the respective region patterns in a row may be determined as the MHI data 410.

The region-pattern-based processing block 123 sequentially transmits the MHI data 410, 420 and 430 of each MHI to the common-information determining block 125 (refer to FIG. 6).

The common-information determining block 125 compares the respective codes of the plurality of MHI data 410, 420 and 430 from each other by a unit of the MHI data based on the identical region pattern, thereby determining whether there is a common code or whether there are codes having a high similarity.

There may be various methods of determining whether the similarity is high or not. For example the common-information determining block 125 may compare the MHI data 411, 421 and 431 corresponding to the first region patterns from each other with respect to each MHI data 410, 420 and 430. If it is determined that a frequency of showing the same binary value is equal to or higher than a preset threshold, the common-information determining block 125 determines that the similarity is high or that the codes are given approximately in common. On the other hand, if it is determined that the frequency of showing the same binary value is lower than the preset threshold, the common-information determining block 125 determines that the similarity is low or that the codes are not given in common.

In such a manner, the common-information determining block 125 determines the similarity by comparing the MHI data generated by the same region pattern, and stores the region pattern and code contents having the high similarity to correspond to the motion command.

For example, suppose that the MHI data 411, 421 and 431 based on the first region pattern shows low similarity, and the MHI data 412, 422 and 432 based on the second region pattern and the MHI data 413, 423 and 433 based on the third region pattern show high similarity. In this case, the common-information determining block 125 determines that the second region pattern and the third region pattern correspond to the motion command targeted for the training, and stores the binary codes of the second region pattern and the third region pattern as the common information that appears in common in the MHI data of the certain motion mode.

The binary code to be stored may one or more of the binary codes of each MHI, or may be a result value obtained by calculating the binary codes of each MHI through a preset function.

With this method, the display apparatus 100 according to an exemplary embodiment can acquire the common information related to the MHI data corresponding to a predetermined motion mode during the training process.

Below, the training process of the display apparatus 100 with regard to a predetermined motion mode will be described according to an exemplary embodiment.

Figure 11:
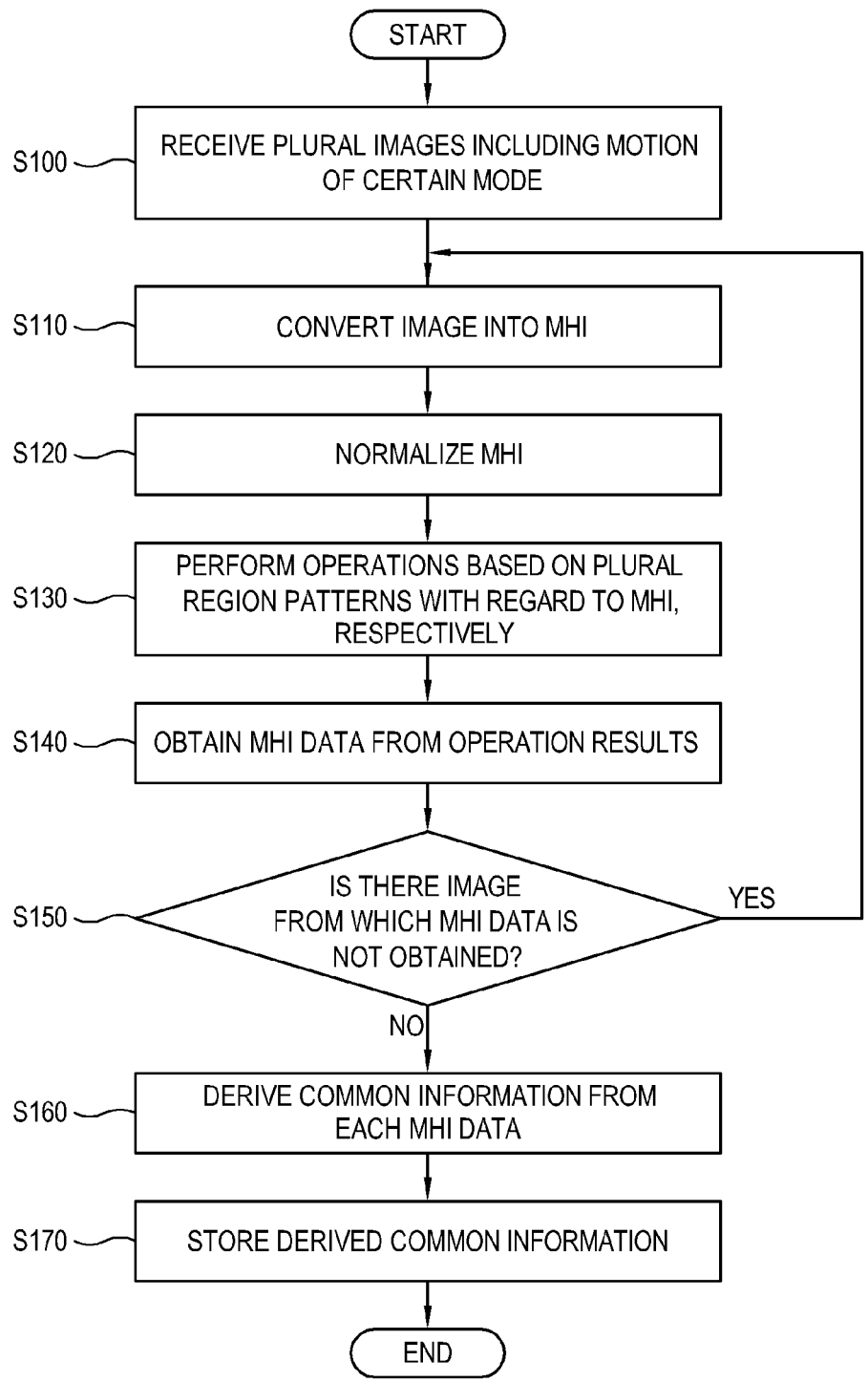
FIG. 11 is a flowchart showing a training process of the display apparatus of FIG. 1 with regard to a predetermined motion mode.

FIG. 11 is a flowchart showing the training process of the display apparatus 100 with regard to a predetermined motion command.

As shown in FIG. 11, at operation S100, the display apparatus 100 receives a plurality of images that involve a motion of a predetermined command targeted for the training. Here, the plurality of received images includes a motion made by one or more users in accordance with a certain motion command.

At operation S110, the display apparatus 100 converts one image into an MHI. At operation S120, the display apparatus 100 normalizes the converted MHI. At operation S130, the display apparatus 100 respectively applies operations by the plurality of preset region patterns to the normalized MHI. At operation S140, the display apparatus 100 obtains the MHI data based on the operation results according to the respective region pattern.

At operation S150, the display apparatus 100 determines whether there is an image from which the MHI data has not been derived. If there is an image from which the MHI data has not been derived from among the plurality of images received at the operation S100, the display apparatus 100 applies the operations S110 to S140 to the corresponding image to thereby obtain the MHI data.

If the MHI data has been derived from all the plurality of images received at the operation S100, the display apparatus 100 derives the common information at operation S160, in which the common information is a code shown in common in the MHI data from the plurality of images or a code for positions having high similarity in the respective MHI data.

At operation S170, the display apparatus 100 stores the derived common information and terminates the training process.

Below, the determination process of determining the motion command with regard to a predetermined motion in the display apparatus 100 will be described according to an exemplary embodiment. This determination process follows the foregoing training process.

Figure 12:
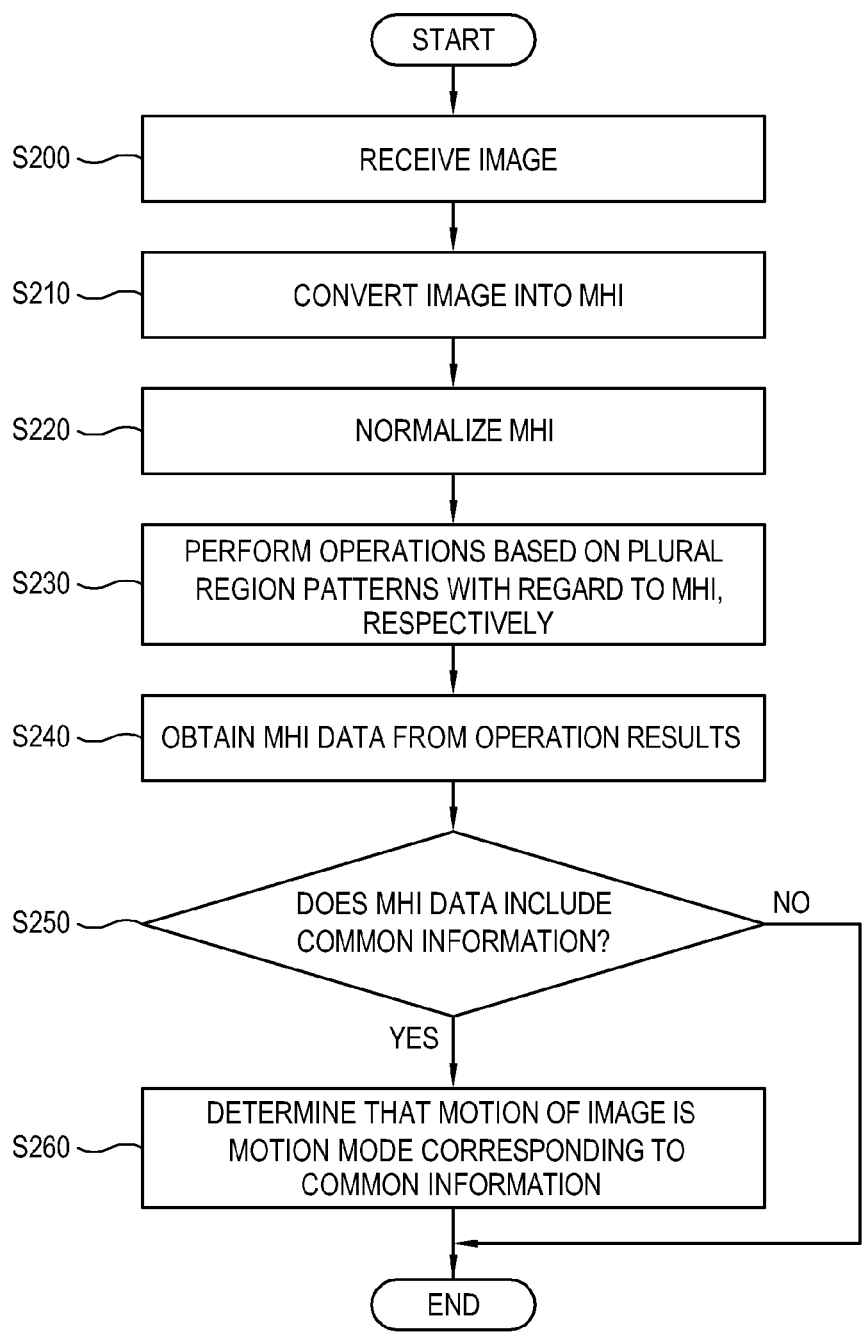
FIG. 12 is a flowchart showing a determination process of the display apparatus of FIG. 1 with regard to a predetermined motion.

FIG. 12 is a flowchart showing the determination process of the display apparatus 100 with regard to a predetermined motion As shown in FIG. 12, at operation S200, the display apparatus 100 receives an image targeted for the determination. This image is captured by the camera 150 (refer to FIG. 2).

At operation S210, the display apparatus 100 converts the corresponding image into an MHI. At operation S220, the display apparatus 100 normalizes the MHI. At operation S230, the display apparatus 100 performs respective operations by the plurality of region patterns with regard to the MHI. At operation S240, the display apparatus 100 obtains the MHI data from the operation results.

The processes performed in the operations S210 to S240 are carried out by substantially the same principle as those in the operations S110 to S140 for the training process of FIG. 11. That is, the MHI converting method, the normalization method, and the region pattern based operation performed in the determination process are performed by substantially the same method as that for the training process.

At operation S250, the display apparatus 100 determines whether the MHI data includes the same or similar code as previously stored common information. The MHI data may include completely the same code as the common information, but such a case does not occur frequently in practice. Therefore, if the difference between the MHI data and the common information is within a preset error range, it may be determined that the MHI data substantially includes the common information.

If it is determined that the MHI data includes or substantially includes a common information, at operation S260 the display apparatus 100 determines the motion on the image corresponds to the corresponding common information, i.e., to the designated motion command. On the other hand, if the MHI data does not substantially include any previously stored common information, a user may be informed of a determination result, or a separate preset process may be performed.

With this method, the display apparatus 100 determines the motion command in the image based on the training results.

Meanwhile, in the foregoing exemplary embodiment, the operations based on the plurality of region patterns are performed with respect to the MHI in order to derive the MHI data of the corresponding MHI. However, in order to increase the accuracy of the determination during the determination process, a separate parameter may be added while generating the MHI data.

Below, such an exemplary embodiment will be described.

Figure 13:
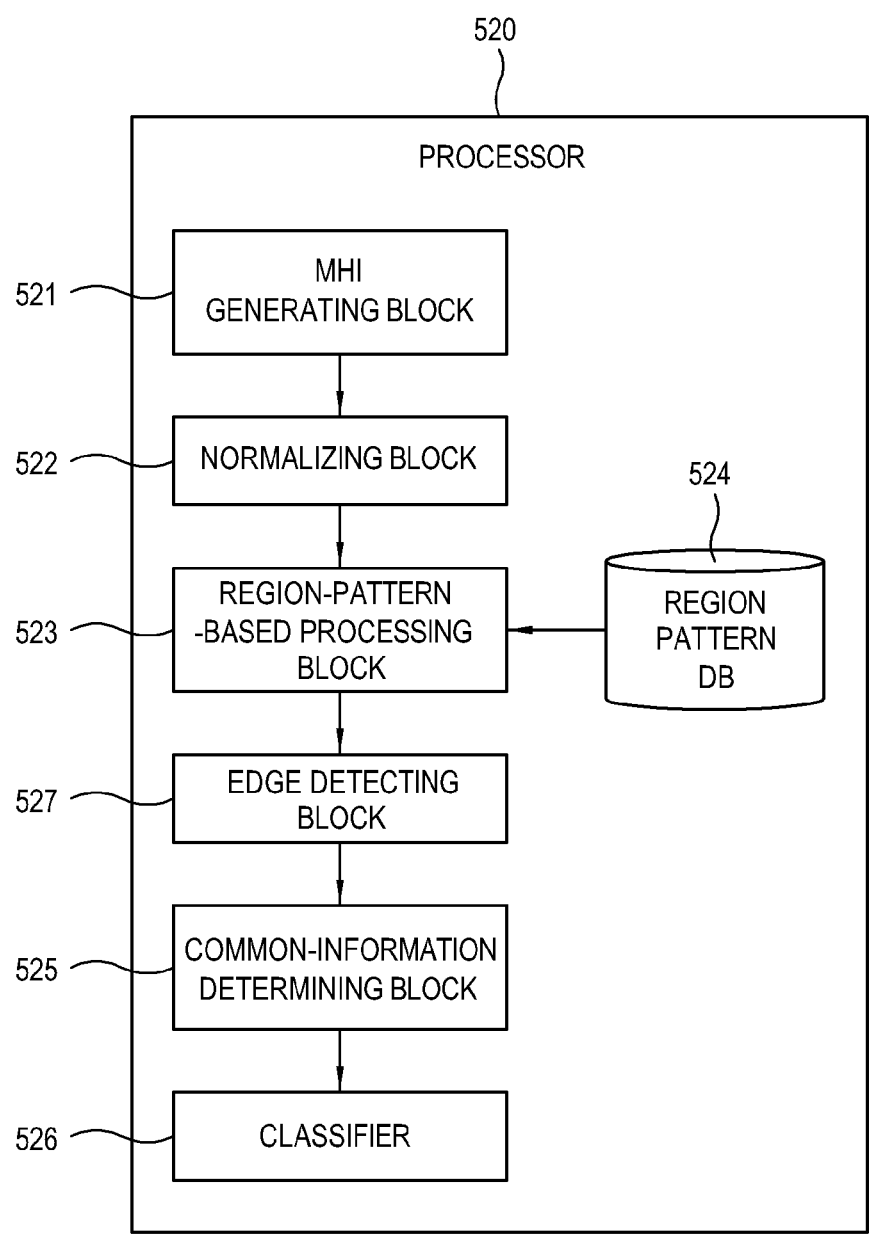
FIG. 13 is a block diagram of a processor of a display apparatus according to a second exemplary embodiment.

FIG. 13 is a block diagram of a processor 520 according to a second exemplary embodiment.

As shown in FIG. 13, the processor 520 according to this exemplary embodiment includes an MHI generating block 521, a normalizing block 522, a region-pattern-based processing block 523, a region pattern DB 524, an edge detecting block 527, a common information determining block 525, and a classifier 526. The elements of the processor 520 are substantially the same as those shown in FIG. 6 except the edge detecting block 527, and thus repetitive descriptions thereof will be avoided as necessary.

The edge detecting block 527 calculates edge information about the size and direction according to the divisional regions of the respective region patterns, while performing the masking and operations for the region patterns with regard to the MHI, and adds the calculated edge information to the MHI data. As an algorithm for extracting the edge, various methods such as Prewitt, Roberts, Compass, Laplacian, Laplacian of Gaussian, LoG, Canny, etc. may be used.

For example, a directional angle derived from extraction results of edge information may be represented by 0, 1, 2, 3 and the like integer in accordance with a preset angle range. For instance, in the case where the region pattern has a divisional region of 2×2, if an operation result with regard to a masking region of the MHI is 1 and edge information values according to the respective divisional regions are 3, 0, 1 and 1, a series of codes of 1 (3, 0, 1, 1) may be derived as the MHI data with regard to the corresponding masking region.

However, this method is just one example. Alternatively, various parameters may be added to the MHI data in accordance with designs.

Subsequently, the method of deriving the common information in training process and the method of performing the determination in the determination process conform to the foregoing exemplary embodiments, and thus details descriptions thereof will be omitted.

Although a few exemplary embodiments have been shown and described, it will be appreciated by those skilled in the art that changes may be made in these exemplary embodiments without departing from the principles and spirit of the invention, the scope of which is defined in the appended claims and their equivalents.

What is claimed is:

1. An image processing apparatus comprising:
a camera configured to generate a plurality of captured images by capturing motion of an object;
an image processor configured to process the plurality of captured images;
a storage configured to store a predetermined information which is common data included in common in a plurality of motion history images (MHI) obtained by capturing respectively the motions by a predetermined form; and
a controller configured to determine that a form of the motion by the object within the plurality of captured images corresponds to the predetermined form if it is determined that MHI data of the plurality of captured images includes the predetermined information,
wherein the controller is further configured to divide an entire pixel region of the at least one of an MHI of the plurality of captured images into a plurality of divided pixel regions, calculate operation data respectively of the divided pixel regions with one of a plurality of predetermined region patterns, and obtain the MHI data of the at least one of the MHI of the plurality of captured images based on the operation data of the respective divided pixel regions,
wherein the one of the plurality of predetermined region patterns comprises a plurality of divisional regions, which are divided into a first region and a second region respectively comprising at least one non-overlapping divisional region from among the plurality of divisional regions, and
the controller is configured to calculate the operation data of each pixel region by selectively applying a binary value in accordance with comparison results between an average pixel value of the first region and an average pixel value of the second region.

2. The image processing apparatus according to claim 1, wherein the controller is further configured to obtain the MHI data by connecting the operation data of the respective divided pixel regions in a row.

3. The image processing apparatus according to claim 1, wherein the one of the plurality of predetermined region patterns comprises a plurality of divisional regions arranged in a matrix, which are divided into a first region and a second region respectively comprising at least one non-overlapping divisional region from among the plurality of divisional regions, and
at least one of the plurality of the predetermined region patterns differs from at least one other region pattern in at least one of a dividing shape of the divisional region and a distinguishing shape between the first and second regions.

4. The image processing apparatus according to claim 3, wherein the divisional regions have respective sizes corresponding to one or more pixels of the MHI of the plurality of captured images.

5. The image processing apparatus according to claim 1, wherein the plurality of divisional regions of the one of the plurality of predetermined region patterns are arranged in a matrix.

6. The image processing apparatus according to claim 5, wherein the controller is further configured to calculate edge information about pixels in the plurality of the divisional regions and to add the edge information to the operation data.

7. The image processing apparatus according to claim 1, wherein the controller is further configured to normalize the MHI of the plurality of captured images to have a preset size or resolution, and to calculate the MHI data from the normalized MHI.

8. A method of controlling an image processing apparatus, the method comprising:
obtaining and storing a predetermined information, the predetermined information being common data included in common in a plurality of motion history images (MHI) obtained by capturing respectively motions by a predetermined form;
receiving a plurality of captured images from a camera, the plurality of captured images being generated by the camera capturing motion of an object; and
determining that a form of the motion by the object within the plurality of captured images corresponds to the predetermined form if it is determined that MHI data of the plurality of captured images includes the predetermined information,
wherein the obtaining and storing the predetermined information comprises
dividing an entire pixel region of at least one of an MHI of the plurality of captured images into a plurality of divided pixel regions;
calculating operation data respectively of the divided pixel regions with one of a plurality of predetermined region patterns; and
obtaining the MHI data of the at least one of the MHI of the plurality of captured images based on the operation data of the respective divided pixel regions,
wherein the one of the plurality of predetermined region patterns comprises a plurality of divisional regions, which are divided into a first region and a second region respectively comprising at least one non-overlapping divisional region from among the plurality of divisional regions, and wherein the calculating the operation data comprises calculating the operation data of each pixel region by selectively applying a binary value in accordance with comparison results between an average pixel value of the first region and an average pixel value of the second region.

9. The method according to claim 8, wherein the MHI data is generated by connecting the operation data of the respective divided pixel regions in a row.

10. The method according to claim 8, wherein the one of the plurality of predetermined region patterns comprises a plurality of divisional regions arranged in a matrix, which are divided into a first region and a second region respectively comprising at least one non-overlapping divisional region from among the plurality of divisional regions, and at least one of the plurality of the predetermined region patterns differs from at least one other region pattern in at least one of a dividing shape of the divisional region and a distinguishing shape between the first and second regions.

11. The method according to claim 10, wherein the divisional regions have respective sizes corresponding to one or more pixels of the MHI of the plurality of captured images.

12. The method according to claim 8, wherein the plurality of divisional regions of the one of the plurality of predetermined region patterns are arranged in a matrix.

13. The method according to claim 12, wherein the calculating the operation data comprises calculating edge information about pixels in the plurality of the divisional regions and adding the edge information to the operation data.

14. The method according to claim 8, wherein the determining comprises normalizing the MHI of the plurality of captured images to have a preset size or resolution, and calculating the MHI data from the normalized MHI.

* * * * *